United States Patent [19]
Obata et al.

[11] Patent Number: 6,072,876
[45] Date of Patent: Jun. 6, 2000

[54] METHOD AND SYSTEM FOR DEPOSITING PRIVATE KEY USED IN RSA CRYPTOSYSTEM

[75] Inventors: Masanori Obata; Hiroyuki Sugiyama, both of Kanagawaken; Moribumi Okukawa, Tokyo; Tatsuaki Okamoto, Kanagawaken, all of Japan

[73] Assignee: Nippon Telegraph and Telephone Corporation, Japan

[21] Appl. No.: 08/900,978

[22] Filed: Jul. 25, 1997

[30] Foreign Application Priority Data

Jul. 26, 1996 [JP] Japan .................................... 8-197996
Oct. 17, 1996 [JP] Japan .................................... 8-274734

[51] Int. Cl.⁷ ................................................... H04L 9/30
[52] U.S. Cl. ........................ 380/286; 380/282; 380/285; 380/30
[58] Field of Search .............................. 380/21, 30, 278, 380/282, 285, 286

[56] References Cited

U.S. PATENT DOCUMENTS

| | | | |
|---|---|---|---|
| 4,944,007 | 7/1990 | Austin | 380/21 |
| 5,557,678 | 9/1996 | Ganesan | 380/21 |
| 5,623,546 | 4/1997 | Hardy | 380/4 |

OTHER PUBLICATIONS

Rivest, R. L., Shamir, A., and Adleman, L.; "A Method for Obtaining Digital Signatures and Public–key Cryptosystems"; Communications of the ACM, vol. 21(2), pp. 120–126; Feb. 1978.

"Private–Key Information Syntax Standard"; Version 1.2, RSA Data Security Inc.; Nov. 1993.

Boyd, C. A.; "Some Applications of Multiple Key Ciphers"; Proceedings of Eurocrypt 88, pp. 455–467; Springer–Verlag; 1988.

Schneier, B.; "Applied Cryptography"; John Wiley & Sons Inc.; 1996.

Primary Examiner—Gilberto Barrón, Jr.
Attorney, Agent, or Firm—Jones & Askew

[57] ABSTRACT

A scheme for depositing a private key used in the RSA cryptosystem which is capable of maintaining the private key more safely, without requiring a user to always carry around a storage medium. In this scheme, a private key of a user is divided into a first partial private key and a second partial private key at a user's entity, where the first partial private key is set to be maintained at the user's entity, while the second partial private key is deposited from the user's entity to the other entity. Then, the second partial private key is delivered from the other entity to the user's entity in response to a request from the user's entity, and the first partial private key maintained at the user's entity and the second partial private key delivered from the other entity are composed so as to obtain the private key to be used in a processing according to the RSA cryptosystem at the user's entity. This scheme can be generalized to a case of dividing the private key into a plurality of partial private keys.

30 Claims, 8 Drawing Sheets

METHOD AND SYSTEM FOR DEPOSITING PRIVATE KEY USED IN RSA CRYPTOSYSTEM

BACKGROUND OF THE INVENTION

1. Field of the Invention

The present invention relates to a method and a system for depositing a private key used in an RSA (Rivest Shamir Adleman) cryptosystem, where a private key of a client user is deposited to a reliable organization such as a key management server, and a key to be deposited is changed, for the purpose of providing a security service such as a user authentication or a secret communication using the RSA cryptosystem between a client and a server in a computer network environment of a client-server system.

2. Description of the Background Art

In recent years, in conjunction with a down-sizing of computers and a spread of Internet, many activities have been undertaken in relation to a security in an open computer network environment. For example, the PEM (Privacy Enhanced Mail) has been standardized by the IETF as the first encrypted mail standard which incorporates cryptographic descriptions in Internet, and a specification in a form of RFC (Request For Comments) is currently issued.

In order to realize a safe communication in such a network, it is indispensable to establish a privacy of communication data and an authenticity of a user based a user authentication. The privacy and the authenticity can be realized by utilizing the cryptographic technique.

For instance, the public key cryptosystem is a cryptographic scheme in which a key for encryption (an encryption key) and a key for decryption (a decryption key) are set to be different from each other so as to make it difficult to guess the decryption key from the encryption key. Each user utilizing the public key cryptosystem has individually assigned encryption key and decryption key, and when a sender sends a message to a receiver, the sender encrypts the message by using the publicly disclosed encryption key of the receiver, and the receiver decrypts the received message by using his own decryption key, so as to realize a communication with a sufficient privacy. Also, by reversing an order of the encryption and the decryption, only a person who owns the decryption key (private key) can attach a digital signature to a message, and anyone who knows that person's encryption key (public key) can verify the digital signature of that person.

One of the most widely known examples of the public key cryptosystem is the RSA cryptosystem (see, R. L. Rivest, A. Shamir and L. Adleman: "A Method for Obtaining Digital Signatures and Public-key Cryptosystems", Communications of the ACM, Vol. 21(2), pp. 120–126, February 1978).

However, in a conventional method for realizing a safe communication by utilizing the cryptographic technique as described above, the private key which is unique to each user must be managed safely, and to this end, there are some known schemes including the following.

One scheme is to maintain the private key in a storage medium having a cryptographic processing function such as a smart card, so as to make it hard to take out the key from an external of the card, and to adopt a highly safe measure of outputting only cryptographically processed data obtained from entered input data by using the private key maintained inside the card.

Another scheme is to maintain the private key in an encrypted form obtained by using a key decryption key generated according to a password phrase of a user, where a legitimate user who knows the password can acquire the private key whenever necessary by entering the password, in response to which the same key decryption key is generated again and the encrypted private key is decrypted by using the generated key decryption key. This latter scheme is specified in the PKCS ("Private-Key Information Syntax Standard", Version 1.2, RSA Data Security Inc., November 1993) which is proposed by the RSA Laboratories as a standard implementation in a case of utilizing the public key cryptographic technique.

However, in the former scheme, there is a problem that it is necessary for a user to always carry around the private key as maintained in the storage medium such as a smart card. Also, in the latter scheme, there is a problem that it is possible to pretend the legitimate user by carrying out the cryptanalysis on the encrypted private key.

On the other hand, it is also possible to improve the safety by setting a period for updating the key shorter, but in the public key cryptosystem such as the RSA cryptosystem it is possible to commit an illegal conduct by generating an unauthorized key pair and pretending the other person. For this reason, in order to guarantee the relation between a user and his public key, a public key certificate which is signed by the private key of either a reliable third party organization or another trustworthy user will be issued normally. In a case of carrying out the mutual authentication between users, the public key certificate of the correspondent user is verified by using the public key of that third party organization or another trustworthy user, and his public key is used only after the correctness of the correspondent user's name and public key is confirmed.

However, at a time of the key updating, the public key is also changed when the private key is changed, so that there is a need to modify the public key certificate that has already been issued and publicly disclosed to many users, every time the key updating takes place, and therefore there is a problem that the key management becomes quite tedious.

SUMMARY OF THE INVENTION

It is therefore an object of the present invention to provide a method and a system for depositing a private key used in the RSA cryptosystem which is capable of maintaining the private key more safely, without requiring a user to always carry around a storage medium.

It is another object of the present invention to provide a method and a system for depositing a private key used in the RSA cryptosystem in which the user's private key is to be used in division into two or more parts, and partial private keys obtained from the user's private key can be changed without changing the user's public key.

According to one aspect of the present invention there is provided a method for depositing a private key used in an RSA cryptosystem, comprising the steps of: dividing a private key of a user into a first partial private key and a second partial private key at a user's entity, where the first partial private key is set to be maintained at the user's entity; depositing the second partial private key from the user's entity to another entity; delivering the second partial private key from said another entity to the user's entity in response to a request from the user's entity; and composing the first partial private key maintained at the user's entity and the second partial private key delivered from said another entity so as to obtain the private key to be used in a processing according to the RSA cryptosystem at the user's entity.

According to another aspect of the present invention there is provided a method for depositing a private key used in an RSA cryptosystem, comprising the steps of: dividing a private key of a user into a plurality of partial private keys at a user's entity, where one of said plurality of partial private keys is set to be maintained at the user's entity; depositing remaining ones of said plurality of partial private keys from the user's entity to mutually different ones of other entities respectively; delivering the remaining ones of said plurality of partial private keys from the other entities to the user's entity in response to a request from the user's entity; and composing said one of said plurality of partial private keys maintained at the user's entity and the remaining ones of said plurality of partial private keys delivered from the other entities so as to obtain the private key to be used in a processing according to the RSA cryptosystem at the user's entity.

According to another aspect of the present invention there is provided a system for depositing a private key used in an RSA cryptosystem, comprising a user's entity and another entity, wherein the user's entity includes: a private key dividing unit for dividing a private key of a user into a first partial private key and a second partial private key, where the first partial private key is set to be maintained at the user's entity; a key depositing unit for depositing the second partial private key to said another entity; a partial private key acquisition unit for requesting a delivery of the second partial private key to said another entity and receiving the second partial private key delivered from said another entity; and a private key composition unit for composing the first partial private key maintained at the user's entity and the second partial private key delivered from said another entity so as to obtain the private key to be used in a processing according to the RSA cryptosystem.

According to another aspect of the present invention there is provided a system for depositing a private key used in an RSA cryptosystem, comprising a user's entity and other entities, wherein the user's entity includes: a private key dividing unit for dividing a private key of a user into a plurality of partial private keys, where one of said plurality of partial private keys is set to be maintained at the user's entity; a key depositing unit for depositing remaining ones of said plurality of partial private keys to mutually different ones of the other entities respectively; a partial private key acquisition unit for requesting a delivery of the remaining ones of said plurality of partial private keys to the other entities and receiving the remaining ones of said plurality of partial private keys delivered from the other entities; and a private key composition unit for composing said one of said plurality of partial private keys maintained at the user's entity and the remaining ones of said plurality of partial private keys delivered from the other entities so as to obtain the private key to be used in a processing according to the RSA cryptosystem.

Other features and advantages of the present invention will become apparent from the following description taken in conjunction with the accompanying drawings.

DETAILED DESCRIPTION OF THE PREFERRED EMBODIMENTS

Referring now to FIG. 1 to FIG. 5, the first embodiment of a method and a system for depositing a private key used in the RSA cryptosystem according to the present invention will be described in detail.

Figure 1:
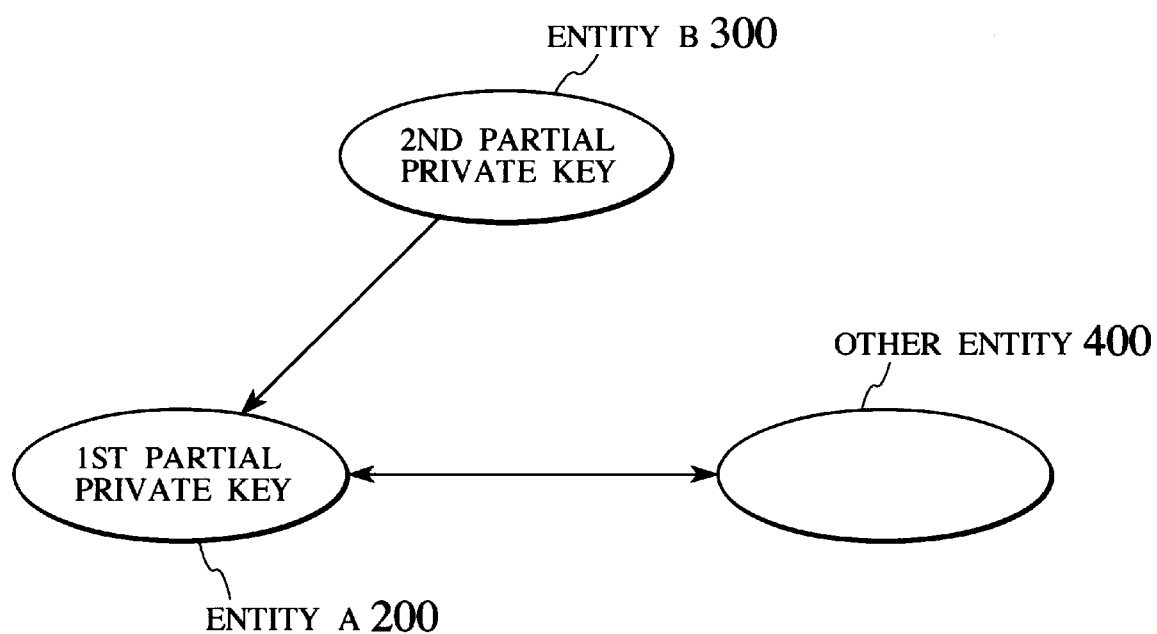
FIG. 1 is a schematic block diagram of a system configuration to which the present invention is applied.
Figure 2:
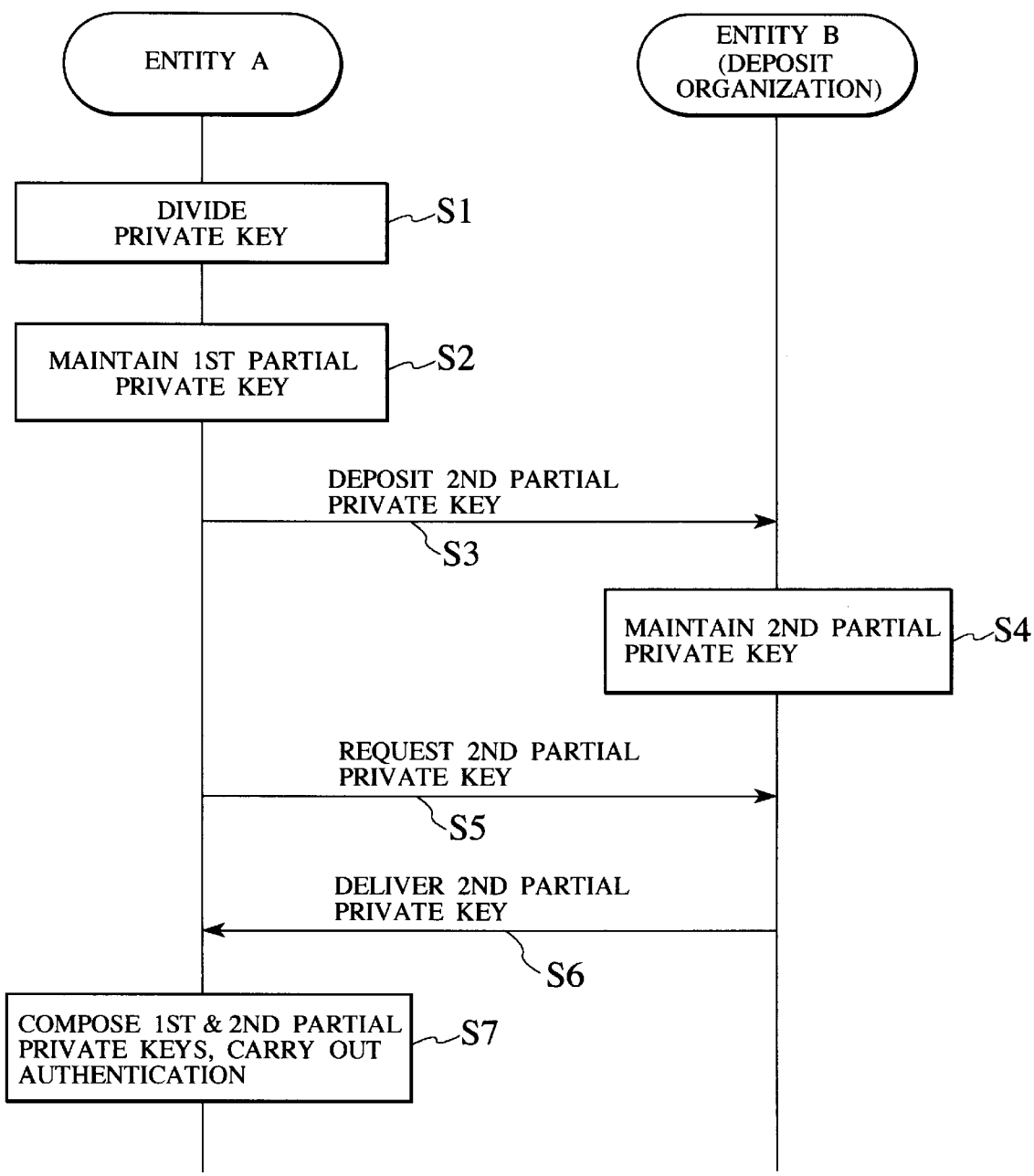
FIG. 2 is a sequence chart for the operation in a private key depositing system according to the first embodiment of the present invention.

FIG. 1 shows a schematic configuration of a system to which the present invention is applied, and FIG. 2 shows an outline of a method for depositing a private key in this first embodiment of the present invention.

The system shown in FIG. 1 comprises an entity A 200 an entity B 300, and the other entity 400, where among the private key and the public key of a user which are to be used in the RSA cryptosystem, the private key is divided into two by the entity A 200 (S1), and one of the partial private keys (a first partial private key) is maintained at the entity A 200 (S2), while the other one of the partial private keys (a second partial private key) is deposited to the entity B 300 (S3) and maintained by the entity B 300 (S4).

Here, according to the Multiple Key cryptosystem (see, C. A. Boyd: "Some Applications of Multiple Key Ciphers", Proceedings of Eurocrypt 88, pp. 455–467, Springer-Verlag, 1988), the private key to be divided into two satisfies the following congruence (1):

$$kp \times ks1 \times ks2 \equiv 1 \pmod{L} \tag{1}$$

where kp is the public key, ks1 is the first partial private key, ks2 is the second partial private key, L is the least common multiple of (p−1) and (q−1), and p and q are arbitrary mutually different large prime numbers. Also, in the following n is a product of p and q.

In other words, the entity A 200 encrypts its own second partial private key in advance in a form that can be decrypted by a key decryption key that is known only to the entity A 200, and deposits this encrypted second partial private key to the entity B 300. Here, the key decryption key and a key (encryption key) for encrypting in a form that can be decrypted by the key decryption key can be a symmetric key according to the symmetric key cryptosystem in which the encryption key and the decryption key are set to be the same such as the DES (Data Encryption Standard) scheme or the FEAL (Fast data Encipherment ALgorithm) scheme (see B. Schneier, "Applied Cryptography", John Wiley & Sons Inc., 1996 for example). It is also possible to use the second partial private key as the encryption key while using the first partial private key and the public key as the key decryption key, according to the RSA cryptosystem.

In addition, these two approaches may be combined so as to increase an amount of calculations required in cryptanalyzing the encrypted second partial private key, and thereby making the one by one attack on a key for encryption practically very difficult.

Next, when a request for acquiring the second partial private key is issued from the entity A 200 to the entity B 300

(S5), the entity B 300 delivers the second partial private key maintained therein to the entity A 200 (S6).

Here, When it becomes necessary for the entity A 200 to have the second partial private key delivered from the entity B 300 the entity A 200 issues a second partial private key acquisition request. Then, upon receiving this second partial private key acquisition request, the entity B 300 retrieves the second partial private key which is safely protected by being encrypted by the encryption key, and delivers this second partial private key to the entity A 200.

Next, at the entity A 200, the authentication processing with respect to the other entity 400 is carried out (S7) by using the private key which is composed from the first partial private key maintained at the entity A 200 itself and the second partial private key delivered from the entity B 300. At this point, when the encrypted second partial private key is acquired, the entity A 200 takes out the key decryption key for decrypting this encrypted second partial private key and decrypts this second partial private key by using that key decryption key, so as to take out the second partial private key. In this manner, only the entity A 200 that knows the proper key decryption key can acquire the second partial private key, and carry out the authentication with respect to the other entity 400 by carrying out the RSA cryptosystem processing using the obtained second partial private key and the first partial private key together as the private key of the user.

Figure 3:
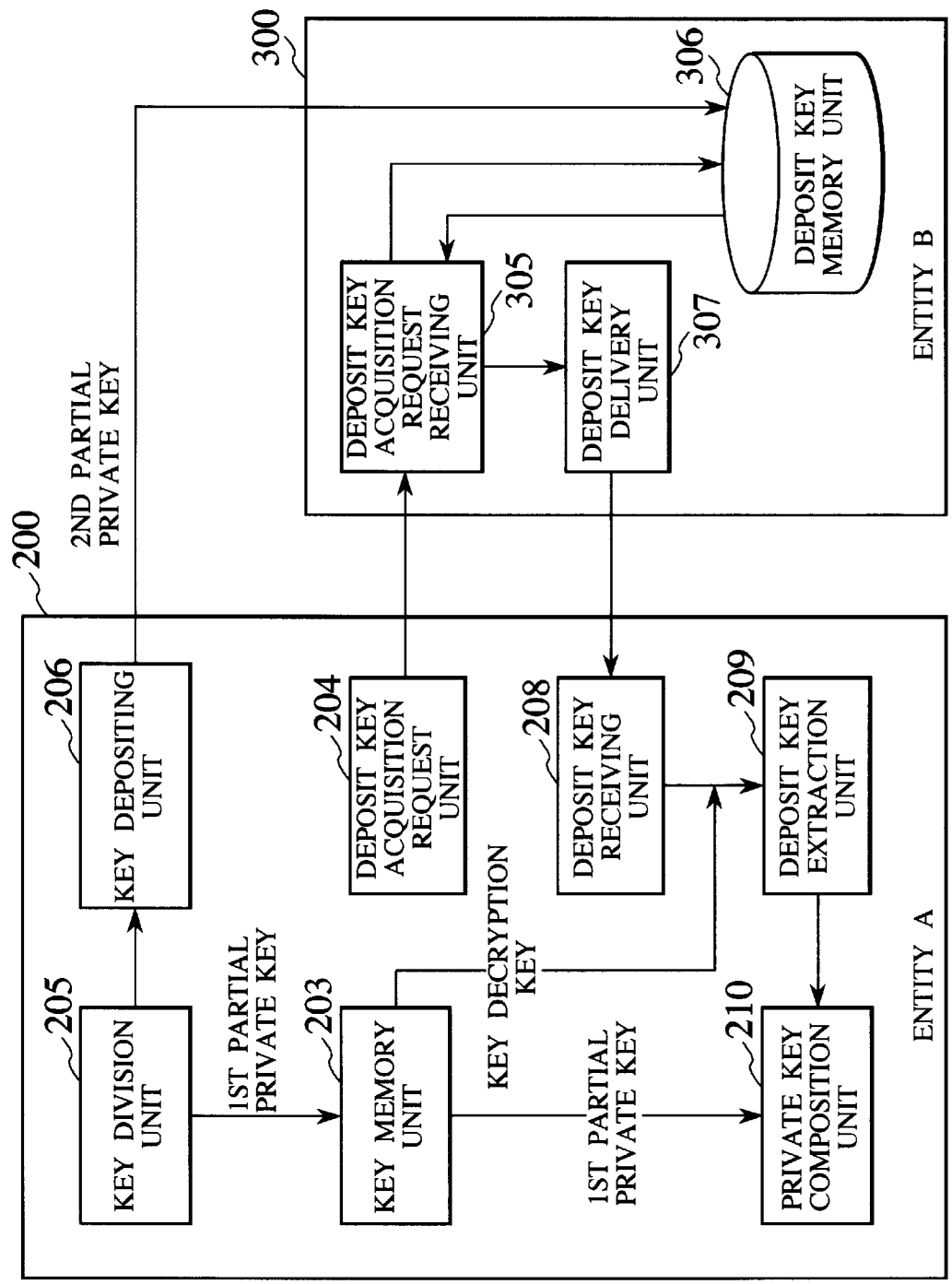
FIG. 3 is a block diagram of an exemplary private key depositing system according to the first embodiment of the present invention.

FIG. 3 shows a configuration of a private key depositing system in the first embodiment of the present invention.

The private key depositing system shown in FIG. 3 comprises the entity A 200 and the entity B 300.

The entity A 200 comprises a key division unit 205, a key depositing unit 206, a key memory unit 203, a deposit key acquisition request unit 204, a deposit key receiving unit 208, a deposit key extraction unit 209, and a private key composition unit 210.

The entity B 300 comprises a deposit key acquisition request receiving unit 305, a deposit key memory unit 306 and a deposit key delivery unit 307.

The key division unit 205 divides the private key to be used in the RSA cryptosystem into two, and transfers one of them (the first partial private key) to the key memory unit 203 while the transferring the other one (the second partial private key) as the deposit key to the key depositing unit 206.

The key depositing unit 206 then deposits the deposit key obtained at the key division unit 205 to the entity B 300.

The key memory unit 203 stores the first partial private key obtained from the private key and the key decryption key.

The deposit key acquisition request unit 204 issues an acquisition request for the deposit key that has been deposited to the entity B 300.

The deposit key receiving unit 208 acquires the deposit key from the entity B 300.

The deposit key extraction unit 209 acquires the key decryption key for decrypting the deposit key from the key memory unit 203, and decrypts the deposit key.

The private key composition unit 210 carries out the authentication with respect to the other entity 400 using the private key obtained by composing the decrypted deposit key and the first partial private key.

The deposit key memory unit 306 of the entity B 300 stores the deposit key deposited from the entity A 200 The deposit key acquisition request receiving unit 305 receives the deposit key acquisition request from the entity A 200, retrieves the deposit key from the deposit key memory unit 306 according to this request, and transfers the retrieved deposit key to the deposit key delivery unit 307.

The deposit key delivery unit 307 delivers the deposit key transferred by the deposit key acquisition request receiving unit 305 to the entity A 200.

Next, a more specific example of a private key depositing system in the first embodiment of the present invention will be described.

First, the variables and functions used in the following description will be defined.

Namely, in the following, kp is the RSA public key of the user while ks1 and ks2 are partial keys of the RSA private key of the user, and these keys kp, ks1 and ks2 are determined such that the congruence (1) described above is satisfied according to the Multiple Key cryptosystem. In addition, ks1 is determined to be in a small number of figures that can be memorized by the user as a password, while ks2 is used as the deposit key to be deposited to a private key deposit organization. M denotes an arbitrary plaintext block, C denotes a result of encryption of M, and (a mod b) denotes a residue of a divided by b. Also, X' is data obtained by encrypting the deposit key ks2 by using the deposit key ks2 itself as the encryption key according to the RSA cryptosystem, while X is data obtained by encrypting X' by using a symmetric key Skey which is generated according to the password according to the symmetric key cryptosystem. Also, a function E denotes the symmetric key encryption algorithm, while a function D denotes an inverse function of the function E.

Figure 4:
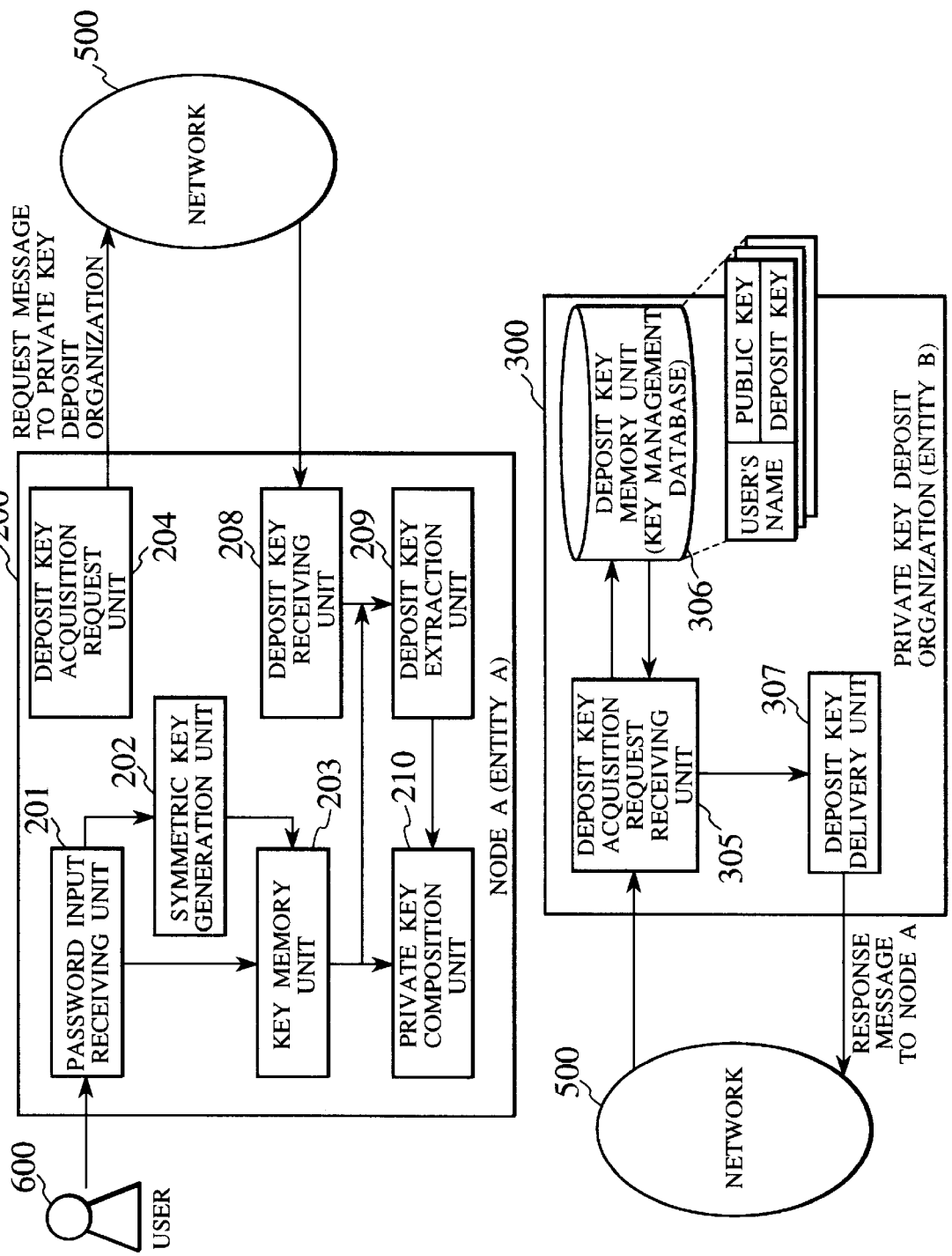
FIG. 4 is a block diagram of another exemplary private key depositing system according to the first embodiment of the present invention.

FIG. 4 shows a specific example of the private key depositing system in the first embodiment of the present invention.

In FIG. 4, the node A (entity A) 200 and the private key deposit organization (entity B) 300 are connected through a network 500, and a user operates the node A 200 in order to have his own deposit key delivered safely from the private key deposit organization. The node A 200 has a password input receiving unit 201 for receiving the password from the user 600 and a symmetric key generation unit 202 for generating the symmetric key Skey from the received password. Also, the structural elements which are identical to those appearing in FIG. 3 are given the same reference numerals in FIG. 4 and their description will be omitted here.

Figure 5:
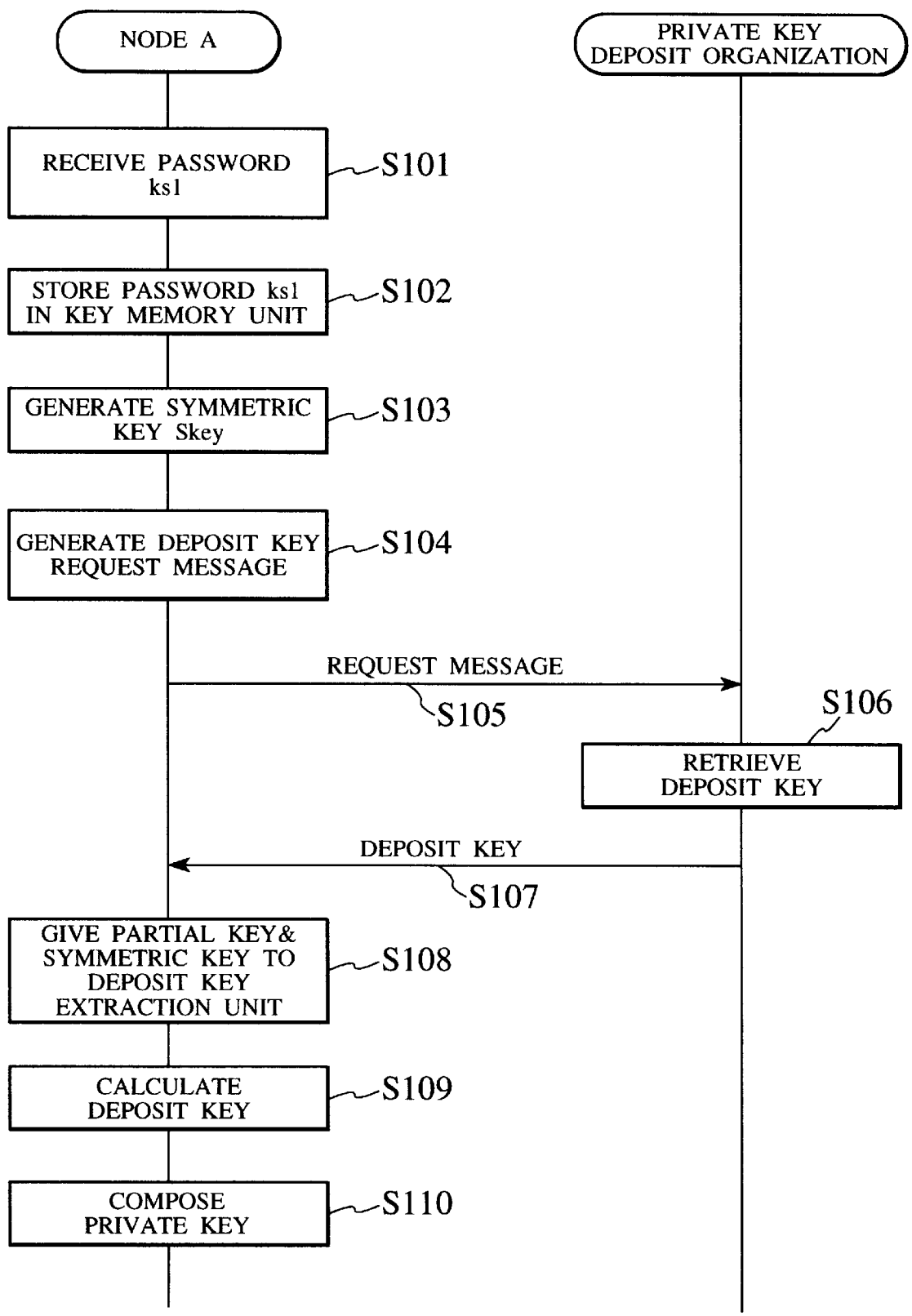
FIG. 5 is a sequence chart for the operation in the private key depositing system of FIG. 4.

Now, the operation in the configuration shown in FIG. 4 will be described with reference to FIG. 5.

In the configuration of FIG. 4, when the node A 200 receives the password ks1 from the user 600 at the password input receiving unit 201 (S101), the received password ks1 is given to the symmetric key generation unit 202 while also being stored in the key memory unit 203 (S102).

The symmetric key generation unit 202 generates the symmetric key Skey to be used in the symmetric key encryption algorithm (S103), and transfers the generated symmetric key Skey to the key memory unit 203 similarly. Here, the generation of the symmetric key Skey at the symmetric key generation unit 202 can be done by using an algorithm such as the one-way random hash function in which an information before the key generation cannot be easily ascertained from a state after the key generation.

A representative example of the typical one-way random function is MD5 proposed by Ron Rivest (see B, Schneier, "Applied Cryptography", John Wiley & Sons Inc., 1996, for example). In MD5, it is possible to generate a hash value of 128 bits with respect to a message in arbitrary length.

Next, in order to acquire the deposit key registered in advance at the private key deposit organization 300, the node A 200 generates a request message for acquiring the deposit key at the deposit key acquisition request unit 204 (S104), and transmits this request message through the network 500 (S105). This request message contains the user's name.

At the private key deposit organization 300, when the request message from the node A 200 is received by the deposit key acquisition request receiving unit 305, the public key and the deposit key corresponding to the user's name contained the received request message are retrieved from the deposit key memory unit (key management database) 306 that is managed by the private key deposit organization 300 (S106).

Here, the public key kp and the protected deposit key X managed by the key management database 306 are registered therein in advance. Also, the protected deposit key X is protected by being encrypted according to the following formula (2) and (3).

$$X' = ks2^{ks2} \mod n \qquad (2)$$

$$X = E(Skey, X') \qquad (3)$$

The public key kp and the protected deposit key X of the user that are retrieved from the key management database 306 by the deposit key acquisition request receiving unit 305 are then given to the deposit key delivery unit 307.

At the deposit key delivery unit 307, a response message for delivering the protected deposit key X to the node A 200 is generated, and transmitted to the node A 200 (S107). This response message contains the public key kp nd the protected deposit key X of the user.

At the node A 200, when the response message is received by the deposit key receiving unit 208, the public key kp and the protected deposit key X contained in the received response message are given to the deposit key extraction unit 209 in order to take out the deposit key (S108). In addition, at the same time, the partial key ks1 and the symmetric key Skey stored in the key memory unit 203 are given to the deposit key extraction unit 209.

The deposit key extraction unit 209 calculates the deposit key by the calculation according to the following formula (4) and (5).

$$X' = D(Skey, X) \qquad (4)$$

$$ks2 = (X')^{ks1 \times kp} \mod n \qquad (5)$$
$$= ks2^{ks2 \times ks1 \times kp} \mod n$$

Here, it should be apparent that, in order to calculate the deposit key ks2 correctly, it is necessary to have the partial key ks1 that is given as the correct password from the user and the symmetric key Skey. The deposit key ks2 calculated in this manner is given to the private key composition unit 210 along with the partial key ks1 so as to be utilized as the RSA private key. The private key composition unit 210 composes the two partial keys, that is the partial key ks1 given from the key memory unit 203 and the deposit key ks2 given from the deposit key extraction unit 209, and utilizes the composed key as the private key of the RSA cryptosystem (S110). Here, the public key kp is utilized in a case of encryption according to the following formula (6) while the private key ks=ks1×ks2 is utilized in a case of decryption according to the following formula (7).

$$C = M^{kp} \mod n \qquad (6)$$

$$M = C^{ks1 \times ks2} \mod n \qquad (7)$$

In this manner, the deposit key maintained at the private key deposit organization 300 can be delivered to the node A 200 in response to the request from the user 600 and the user 600 can carry out the authentication with respect to the other entity by using the password which is the first partial private key known to himself and the second partial private key which is the deposit key delivered from the private key deposit organization 300.

In addition, in maintaining and delivering the deposit key, it is possible to manage and deliver the deposit key safely by encrypting the deposit key in a form that can be decrypted by the key decryption key known only to the user 600 such as the password.

Moreover, the deposit key can be safely delivered by using the symmetric key, the first partial private key, or a combination of both as the key decryption key for decrypting the protected deposit key.

Figure 6:
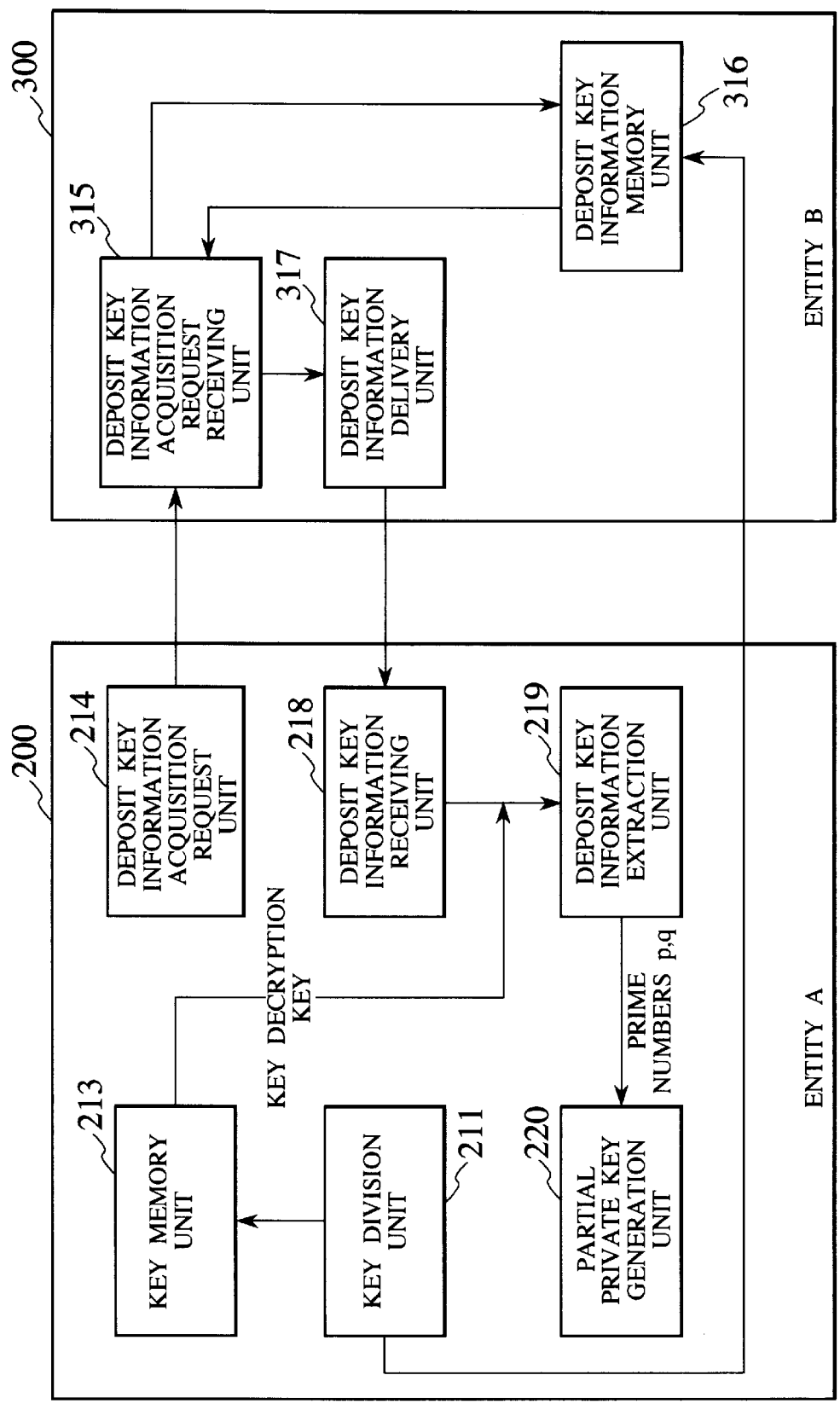
FIG. 6 is a block diagram of an exemplary private key depositing system according to the second embodiment of the present invention.
Figure 7:
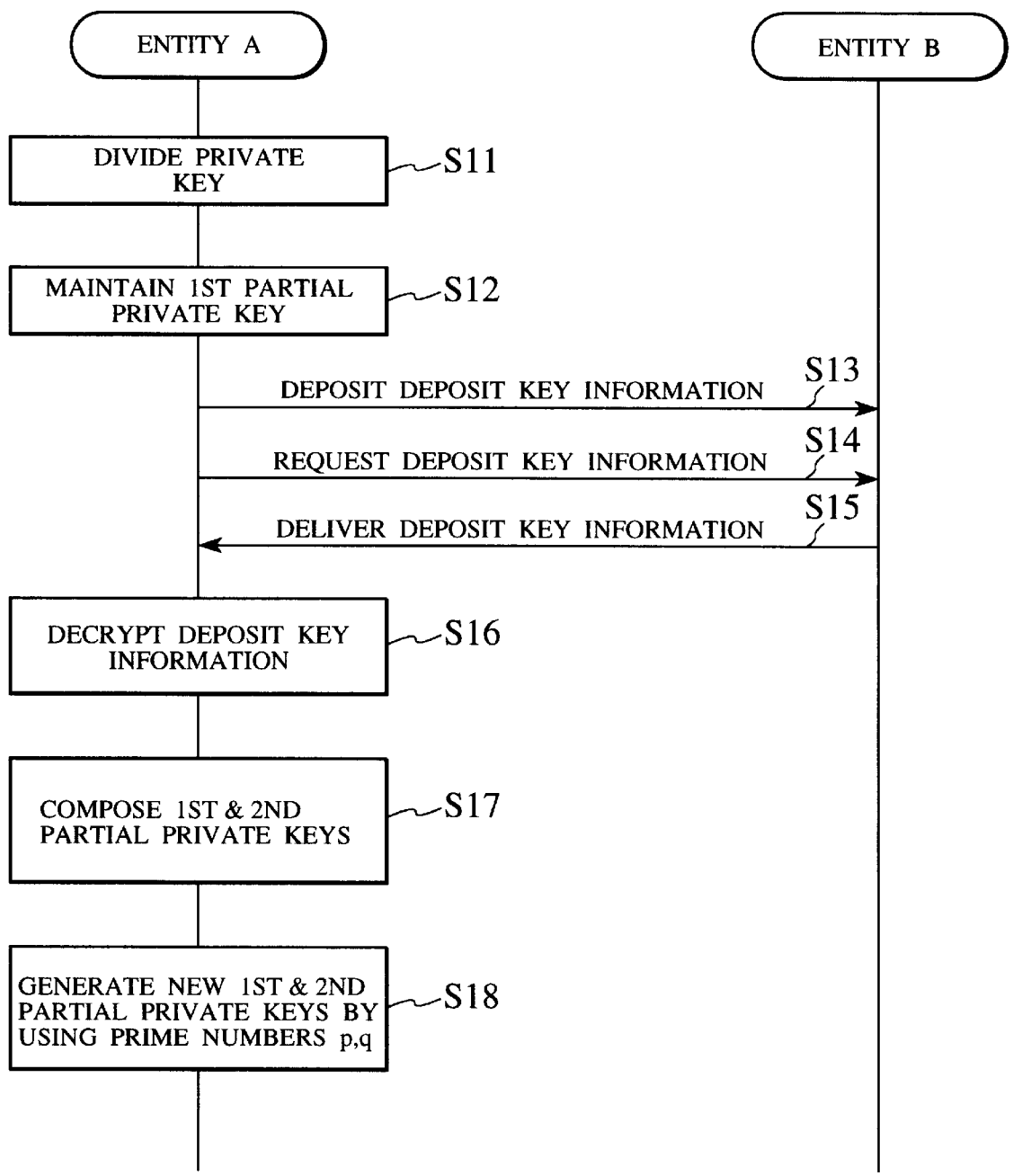
FIG. 7 is a sequence chart for the operation in the private key depositing system of FIG. 6.
Figure 8:
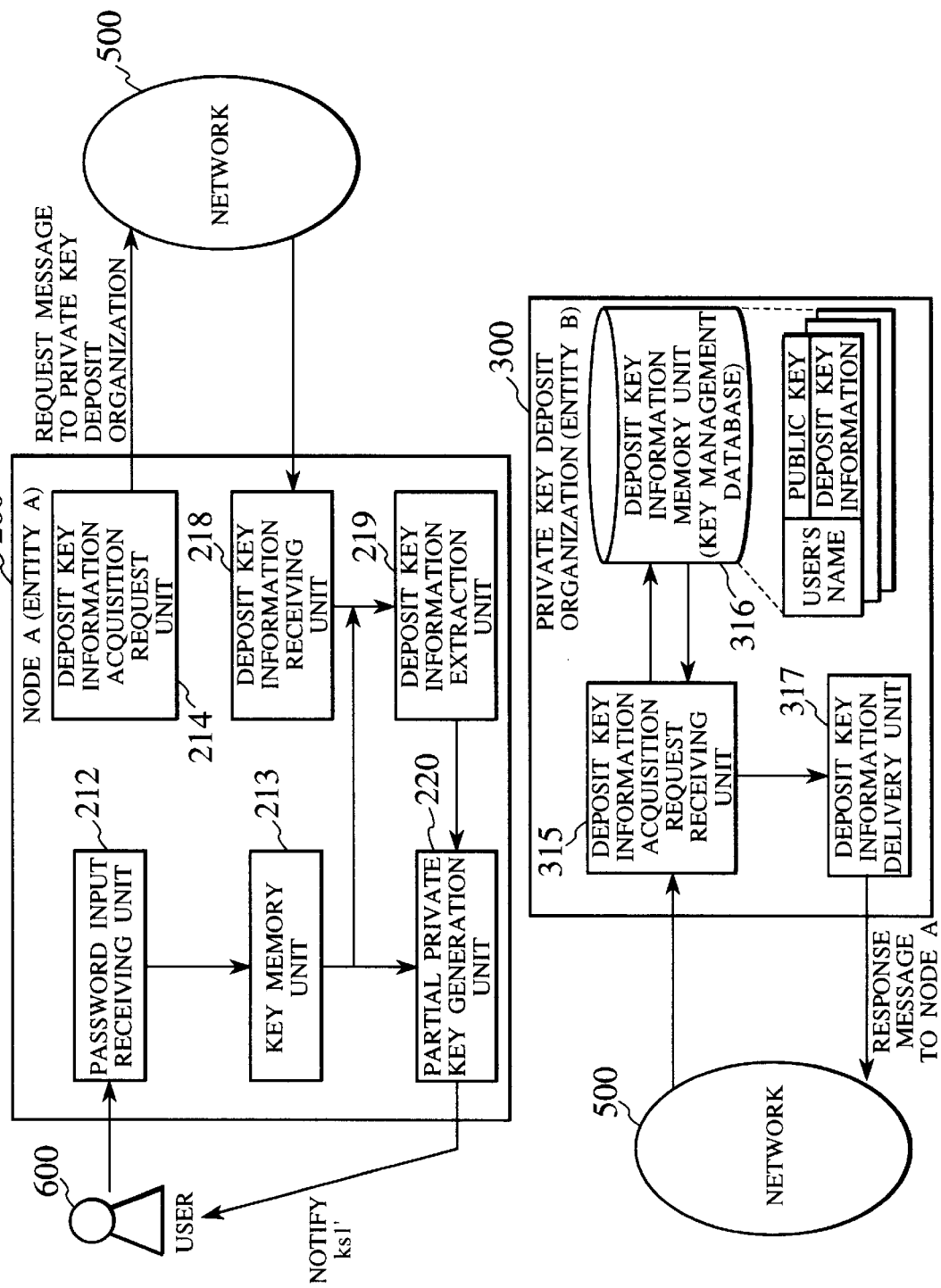
FIG. 8 is a block diagram of another exemplary private key depositing system according to the second embodiment of the present invention.

Referring now to FIG. 6 to FIG. 8, the second embodiment of a method and a system for depositing a private key used in the RSA cryptosystem according to the present invention, which is related to the key change, will be described in detail. Here, the system to which the present invention is applied is the same as that shown in FIG. 1 described above.

FIG. 6 shows a configuration of a private key depositing system in this second embodiment of the present invention, and FIG. 7 shows an outline of a method for depositing a private key in this second embodiment of the resent invention.

The entity A 200 shown in FIG. 6 comprises: a key division unit 211 for dividing the private key into the first partial private key and the second partial private key; a key memory unit 213 for storing the first partial private key and the key decryption key; a deposit key information acquisition request unit 214 for making a request for a delivery of a deposit key information formed by the second partial private key deposited to the entity B 300 and the prime numbers p and q; a deposit key information receiving unit 218 for receiving the deposit key information from the entity B 300; a deposit key information extraction unit 219 for extracting the second partial private key and the prime numbers p and q by decrypting the encrypted deposit key information given from the deposit key information receiving unit 218 by using the key decryption key stored in the key memory unit 213; and a partial private key generation unit 220 for generating a new first partial private key and a new second partial private key from the prime numbers p and q.

The entity B 300 shown in FIG. 6 comprises: a deposit key information acquisition request receiving unit 315 for receiving the deposit key information delivery request from the entity A 200; a deposit key information memory unit 316 for storing the deposit key information which is encrypted by using the encryption key in advance, and returning the protected deposit key information corresponding to the entity A 200 in response to the retrieval request from the deposit key information acquisition request receiving unit 315; and a deposit key information delivery unit 317 for delivering the protected deposit key information received from the deposit key information acquisition request receiving unit 315 to the entity A 200.

First, among the private key and the public key of a user which are to be used in the RSA cryptosystem, the private key is divided into two by the entity A 200 (S11), and one of the partial private keys (a first partial private key) is maintained at the entity A 200 (S12), while the other one of the partial private keys (a second partial private key) is deposited to the entity B 300 (S13) and maintained by the entity B 300.

Here, according to the Multiple Key cryptosystem (see, C. A. Boyd: "Some Applications of Multiple Key Ciphers", Proceedings of Eurocrypt 88, pp. 455–467, Springer-Verlag, 1988), the private key to be divided into two satisfies the following congruence (1):

$$kp \times ks1 \times ks2 \equiv 1 \pmod{L} \tag{1}$$

where kp is the public key, ks1 is the first partial private key, ks2 is the second partial private key, L is the least common multiple of (p−1) and (q−1), and p and q are arbitrary mutually different large prime numbers. Also, in the following n is a product of p and q.

The entity A 200 encrypts the deposit key information formed by the second partial private key obtained from the private key at the key division unit 211 and the prime numbers p and q in a form that can be decrypted by a key decryption key that is known only to the entity A 200, and deposits this encrypted deposit key information to the entity B 300. Here, the key decryption key and a key (encryption key) for encrypting in a form that can be decrypted by the key decryption key can be a symmetric key according to the symmetric key cryptosystem in which the encryption key and the decryption key are set to be the same such as the DES (Data Encryption Standard) scheme or the FEAL (Fast data Encipherment ALgorithm) scheme (see B. Schneier, "Applied Cryptography", John Wiley & Sons Inc., 1996 for example). It is also possible to use the second partial private key as the encryption key while using the first partial private key and the public key as the key decryption key, according to the RSA cryptosystem.

In addition, these two approaches may be combined so as to increase an amount of calculations required in cryptanalyzing the encrypted second partial private key, and thereby making the one by one attack on a key for encryption practically very difficult.

Next, the deposit key information acquisition request unit 214 of the entity A 200 issues an acquisition request for the deposit key information to the entity B 300 (S14).

In response, when this request is received, the deposit key information acquisition request receiving unit 315 of the entity B 300 retrieves the deposit key information which is safely protected by being encrypted by the encryption key from the deposit key information memory unit 316. Then, the entity B 300 delivers the protected deposit key information to the entity A 200 from the deposit key information delivery unit 317 (S15).

Next, at the entity A 200, the deposit key information delivered from the deposit key information delivery unit 317 is received at the deposit key information receiving unit 218, and transferred to the deposit key information extraction unit 219 in order to decrypt the deposit key information.

The deposit key information extraction unit 219 takes out the deposit key information by decrypting the protected deposit key information using the key decryption key stored in the key memory unit 213 (S16). In this manner, only the entity A 200 that knows the proper key decryption key can acquire the deposit key information, and compose the first partial private key and the second partial private key together as the private key ks (S17).

In addition, at the partial private key generation unit 220, using the prime numbers p and q in the deposit key information, the partial private keys are changed without changing the public key (S18), by generating a new first partial private key ks1' and a new second partial private key ks2' which satisfy the following congruence (8).

$$ks1' \times ks2' \equiv ks \pmod{L} \tag{8}$$

Next, a more specific example of a private key depositing system in the second embodiment of the present invention will be described.

First, the variables and functions used in the following description will be defined.

Namely, in the following, kp is the RSA public key of the user while ks1 and ks2 are partial keys of the RSA private key of the user, and these keys kp, ks1 and ks2 are determined such that the congruence (1) described above is satisfied according to the Multiple Key cryptosystem. In addition, ks1 is determined to be in a small number of figures that can be memorized by the user as a password, while ks2 and the prime numbers p and q are used as the deposit key information to be deposited to a private key deposit organization. M denotes an arbitrary plaintext block, C denotes a result of encryption of M, and (a mod b) denotes a residue of a divided by b. Also, X" is data obtained by encrypting the deposit key information by using the deposit key ks2 itself as the encryption key according to the RSA cryptosystem.

FIG. 8 shows a specific example of the private key depositing system in the second embodiment of the present invention.

In FIG. 8, the node A corresponds to the entity A 200 described above and the private key deposit organization corresponds to the entity B 300 described above. Also, the structural elements which are identical to those appearing in FIG. 6 are given the same reference numerals in FIG. 8 and their description will be omitted here.

In the configuration of FIG. 8, the node A 200 comprises a password input receiving unit 212 for receiving the password from the user 600, the key memory unit 213, the deposit key information acquisition request unit 214, the deposit key information receiving unit 218, the deposit key information extraction unit 219, and the partial private key generation unit 220.

The private key deposit organization 300 comprises the deposit key information acquisition request receiving unit 315, the deposit key information memory unit (key management database) 316 which stores the deposit key information deposited from the user's node along with the public key in correspondence to each user's name, and the deposit key information delivery unit 317.

Here, the node A 200 and the private key deposit organization 300 are connected through a network 500.

Now, the operation in the configuration shown in FIG. 8 will be described.

When the node A 200 receives the password ks1 from the user 600 at the password input receiving unit 212, the received password ks1 is stored in the key memory unit 213.

Next, in order to acquire the deposit key information registered in advance at the private key deposit organization 300, the node A 200 generates a request message for acquiring the deposit key information at the deposit key information acquisition request unit 214, and transmits this request message through the network 500. This request message contains the user's name.

At the private key deposit organization 300 when the request message from the node A 200 is received by the deposit key information acquisition request receiving unit 315, the public key and the deposit key information corresponding to the user's name contained the received request message are retrieved from the key management database 316 that is managed by the private key deposit organization 300.

Here, the public key kp and the protected deposit key information X" managed by the key management database 316 are registered therein in advance. Also, the protected deposit key information X" is protected by being encrypted according to the following formula (9).

$$X'' = (ks2, p, q)^{ks2} \mod n \quad (9)$$

The public key kp and the protected deposit key information X" of the user that are retrieved from the key management database 316 by the deposit key information acquisition request receiving unit 315 are then given to the deposit key information delivery unit 317.

At the deposit key information delivery unit 317, a response message for delivering the protected deposit key information X" to the node A 200 is generated, and transmitted to the node A 200. This response message contains the public key kp and the protected deposit key information "X of the user.

At the node A 200, when the response message is received by the deposit key information receiving unit 218 the public key kp and the protected deposit key information X" contained in the received response message are given to the deposit key information extraction unit 219 in order to take out the deposit key information. In addition, at the same time, the partial key ks1 stored in the key memory unit 213 is given to the deposit key information extraction unit 219.

The deposit key information extraction unit 219 calculates the deposit key information by the calculation according to the following formula (10).

$$(ks2, p, q) = (X'')^{ks1 \times kp} \mod n \quad (10)$$
$$= (ks2, p, q)^{ks2 \times ks1 \times kp} \mod n$$

Here, it should be apparent that, in order to calculate the deposit key information correctly, it is necessary to have the partial key ks1 that is given as the correct password from the user. The deposit key ks2 in the deposit key information calculated in this manner can be composed with the partial key ks1 according to:

$$ks = ks1 \times ks2 \quad (11)$$

and utilized as the RSA private key ks.

In addition, at the partial private key generation unit 220 using the partial key ks1 given from the key memory unit 213 and the deposit key ks2 and the prime numbers p and q given from the deposit key information extraction unit 219 a new first partial private key ks1' and a new second partial private key ks2' can be generated according to the congruence (8) described above.

After the generation of these new partial keys, the new partial key ks1' to be used as the password is notified to the user, and the new deposit key information to be deposited to the private key deposit organization 300 is calculated by the following formula (12) which is similar to the above described formula (9).

$$X'' = (ks2', p, q)^{ks2'} \mod n \quad (12)$$

It should be apparent that, by means of the above described procedure, the two partial private keys of the user can be changed at any time, without changing the public key kp.

It is to be noted that, in the embodiments described above, a case of dividing the private key into two has been described, but the method for depositing the private key according to the present invention is equally applicable to a more general case of dividing the private key into more than two plural parts. Namely, according to the Multiple Key cryptosystem, the private key that satisfies the following congruence (13):

$$kp \times ks1 \times ks2 \times \ldots \times ksm \equiv 1 \pmod{L} \quad (13)$$

can be used, and kp is set as the public key, ks1 is set as the first partial private key, ks2 is set as the second partial private key, and ksm is set as the m-th partial private key.

In this case, the first partial private key is maintained by the user, while the remaining (m−1) pieces of partial private keys are respectively deposited to (m−1) sets of the other entities.

At the user's entity, the RSA private key ks can be calculated from the partial private keys delivered from these other entities in response to the request and the first partial private key maintained by the user himself according to the following formula (14).

$$ks = ks1 \times ks2 \times \ldots \times ksm \quad (14)$$

Also, similarly as in the second embodiment described above, the prime numbers p and q used at a time of generating the private key can be deposited to one of the other entities along with the remaining partial private keys, and new partial private keys ks1', ks2', ..., ksm' that satisfy:

$$ks1' \times ks2' \times \ldots \times ksm' \equiv ks \pmod{L} \quad (15)$$

can be generated by using the prime numbers p and q which are delivered from that one of the other entities along with the remaining partial private keys and the private key ks composed at the user's entity, so as to change the partial private keys without changing the public key.

In this case, it basically suffices to deposit the prime numbers p and q to one other entity, but it is also possible to deposit the prime number p and the prime number q to different entities, if desired.

It is also possible to use a number of new partial private keys that is different from a number of the original partial private keys, if desired.

It is also possible to change or interchange the entities to which new partial private keys are to be deposited, so as to deposit new partial private keys differently from the corresponding original partial private keys, if desired.

It is also to be noted that, in the embodiments described above, an example in which the public key is acquired from the other entity has been described, but the present invention is not limited to this example and the public key may be stored in the key memory unit 213 instead, if desired.

As described, according to the present invention, the private key of the user which is used in the RSA cryptosystem is divided into two, one of them is deposited to the private key deposit organization, and that one of the divided partial private keys is acquired from the private key deposit organization according to the need and composed with the other one of the divided partial private key, so that only the legitimate user can acquire the deposited partial private key and carry out the authentication using the obtained private key.

Also, the partial private key to be deposited to the private key deposit organization can be deposited in an encrypted form obtained by using a symmetric key, so that when the request for acquiring that partial private key is issued from the user's entity, the deposit key can be decrypted at the user's entity, and therefore only the entity which owns the correct symmetric key can acquire the deposit key.

Moreover, the deposit key to be deposited to the private key deposit organization can be generated by encrypting the partial private key to be deposited using that partial private key itself as the encryption key, so that the deposit key given from the private key deposit organization cannot be decrypted unless the correct first partial private key is available at an entity which received the deposit key.

In addition, the encrypted deposit key can be further encrypted by using the symmetric key which is known only to the user's entity, and then deposited to the private key deposit organization, so as to realize an even higher security level.

Also, according to the present invention, among the public key and the private key utilized in the RSA cryptosystem, the private key is divided into two and the first partial private key is maintained at the user's entity, while the second partial private key is deposited to the other entity, so that it suffices to maintain the first partial private key alone at the user's entity, and whenever necessary, the second partial private key can be acquired from the other entity and these two partial private keys are combined, and therefore it is safe because there is no need to maintain both of these partial private keys at a single location.

Moreover, the prime numbers p and q can be attached to the second partial private key to be deposited to the other entity, and in a case of changing the first partial private key and the second partial private key, a new first partial private key and a new second partial private key can be generated at the user's entity by using these prime numbers p and q, without changing the public key, so that it becomes possible to change and manage the keys easily and there is no need to change the public key at the other entities.

Also, according to the present invention, the RSA private key is divided into plural parts and one partial private key is maintained by the user, while the remaining partial private keys are deposited to the other entities, so that it is safe because the private key is maintained as divided plural parts. Also, it is possible make the partial private key to be maintained by the user can be set in a form of a password which has a sufficiently short length that can be memorized by the human being. Because of these features, the present invention is capable of realizing the following advantages.

(1) Location Free:

For the user, the processing using the RSA cryptosystem becomes available not only at a specific local computer but also at any computer which is connected to the network.

(2) Device Free:

There is no need for the user to carry around any device for storing the private information. In other words, the private information for the purpose of identifying the user can be provided on a basis of an amount of information that can be memorized by the human being.

(3) Safety:

Even if one partial private key becomes known to the other person, it is impossible to use it as the RSA private key unless all the other remaining partial private keys become also known, so that a high level safety can be realized.

Also, it is possible to realize a system in which only the legitimate user who knows the private information can utilize the private key.

Also, within a closed range to which the present invention is applied, it becomes possible to prove the safety of the system convincingly. For example, in the conventional scheme for storing the private key in a file, even though the RSA cryptosystem algorithm is used for the entity authentication, the other algorithm such as DES scheme is to be used in order to encrypt the private key, so that it has been impossible to clearly prove which algorithm's strength is really responsible for the safety of the system after all. In contrast, according to the present invention, it is possible to prove the safety of the system convincingly to the user.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A method for depositing a private key used in an RSA cryptosystem, comprising the steps of:

dividing a private key of a user into a first partial private key and a second partial private key at a user's entity, where the first partial private key is set to be maintained at the user's entity;

depositing the second partial private key from the user's entity to another entity;

delivering the second partial private key from said another entity to the user's entity in response to a request from the user's entity; and composing the first partial private key maintained at the user's entity and the second partial private key delivered from said another entity so as to obtain the private key to be used in a processing according to the RSA cryptosystem at the user's entity.

2. The method of claim 1, wherein at the depositing step, the user's entity encrypts the second partial private key by using an encryption key so as to obtain an encrypted second partial private key that can be decrypted by using a key decryption key known only to the user's entity, and deposits the encrypted second partial private key;

at the delivering step, said another entity delivers the encrypted second partial private key; and at the composing step, the user's entity obtains the second partial private key by decrypting the encrypted second partial private key by using the key encryption key.

3. The method of claim 2, wherein the encryption key and the key decryption key are a symmetric key generated at the user's entity.

4. The method of claim 3, wherein the symmetric key is given in a form of a hash value obtained from the first partial private key by using a one-way random hash function at the user's entity.

5. The method of claim 2, wherein the encryption key is the second partial private key itself, and the key decryption key is formed by the first partial private key and a public key of the user.

6. The method of claim 5, wherein said another entity maintains the second partial private key along with the public key, and delivers the second partial private key and the public key at the delivering step; and at the composing step, the user's entity forms the key decryption key from the first partial private key maintained at the user's entity and the public key delivered from said another entity.

7. The method of claim 1, wherein at the depositing step, the user's entity encrypts the second partial private key by using the second partial private key itself, further encrypts an encrypted second partial private key by using a symmetric key known only to the user's entity so as to obtain a deposit key, and deposits the deposit key;

at the delivering step, said another entity delivers the deposit key; and at the composing step, the user's entity obtains the encrypted second partial private key by decrypting the deposit key by using the symmetric key, and obtains the second partial private key by decrypting the encrypted second partial private key by using the first partial private key and a public key of the user.

8. The method of claim 7, wherein the symmetric key is given in a form of a hash value obtained from the first partial private key by using a one-way random hash function at the user's entity.

9. The method of claim 7, wherein said another entity maintains the second partial private key along with the public key, and delivers the second partial private key and the public key at the delivering step; and at the composing step, the user's entity decrypts the encrypted second partial private key by using the first partial private key maintained at the user's entity and the public key delivered from said another entity.

10. The method of claim 1, wherein the first partial private key is maintained at the user's entity as a password memorized by the user.

11. The method of claim 10, wherein the user's entity requests a delivery of the second partial private key to said another entity when the password is entered into the user's entity by the user.

12. The method of claim 1, wherein the user's entity requests a delivery of the second partial private key to said another entity when the user carries out the processing according to the RSA cryptosystem at the user's entity.

13. The method of claim 1, wherein at the depositing step, the user's entity also deposits prime numbers p and q that are used in generating the private key;

at the delivering step, said another entity also delivers the prime numbers p and q along with the second partial private key; and the method further comprising the step of generating a new first partial private key and a new second partial private key which are different from the first partial private key and the second partial private key, without changing a public key of the user, by using the private key obtained at the composing step and the prime numbers p and q delivered at the delivering step.

14. A method for depositing a private key used in an RSA cryptosystem, comprising the steps of:

dividing a private key of a user into a plurality of partial private keys at a user's entity, where one of said plurality of partial private keys is set to be maintained at the user's entity;

depositing remaining ones of said plurality of partial private keys from the user's entity to mutually different ones of other entities respectively;

delivering the remaining ones of said plurality of partial private keys from the other entities to the user's entity in response to a request from the user's entity; and composing said one of said plurality of partial private keys maintained at the user's entity and the remaining ones of said plurality of partial private keys delivered from the other entities so as to obtain the private key to be used in a processing according to the RSA cryptosystem at the user's entity.

15. The method of claim 14, wherein at the depositing step, the user's entity also deposits prime numbers p and q that are used in generating the private key to one of the other entities;

at the delivering step, said one of the other entities also delivers the prime numbers p and q along with one of the remaining ones of said plurality of partial private keys; and the method further comprising the step of generating a plurality of new partial private keys which are different from said plurality of partial private keys, without changing a public key of the user, by using the private key obtained at the composing step and the prime numbers p and q delivered at the delivering step.

16. A system for depositing a private key used in an RSA cryptosystem, comprising a user's entity and another entity, wherein the user's entity includes:

a private key dividing unit for dividing a private key of a user into a first partial private key and a second partial private key, where the first partial private key is set to be maintained at the user's entity;

a key depositing unit for depositing the second partial private key to said another entity;

a partial private key acquisition unit for requesting a delivery of the second partial private key to said another entity and receiving the second partial private key delivered from said another entity; and a private key composition unit for composing the first partial private key maintained at the user's entity and the second partial private key delivered from said another entity so as to obtain the private key to be used in a processing according to the RSA cryptosystem.

17. The system of claim 16, wherein the key depositing unit encrypts the second partial private key by using an encryption key so as to obtain an encrypted second partial private key that can be decrypted by using a key decryption key known only to the user's entity, and deposits the encrypted second partial private key;

said another entity delivers the encrypted second partial private key in response to a request from the user's entity; and the private key composition unit obtains the second partial private key by decrypting the encrypted second partial private key by using the key encryption key.

18. The system of claim 17, wherein the encryption key and the key decryption key are a symmetric key generated at the user's entity.

19. The system of claim 18, wherein the symmetric key is given in a form of a hash value obtained from the first partial private key by using a one-way random hash function at the user's entity.

20. The system of claim 17, wherein the encryption key is the second partial private key itself, and the key decryption key is formed by the first partial private key and a public key of the user.

21. The system of claim 20, wherein said another entity maintains the second partial private key along with the public key, and delivers the second partial private key and the public key in response to a request from the user's entity; and the private key composition unit forms the key decryption key from the first partial private key maintained at the user's entity and the public key delivered from said another entity.

22. The system of claim 16, wherein the key depositing unit encrypts the second partial private key by using the second partial private key itself, further encrypts an encrypted second partial private key by using a symmetric key known only to the user's entity so as to obtain a deposit key, and deposits the deposit key;

said another entity delivers the deposit key in response to a request from the user's entity; and the private key composition unit obtains the encrypted second partial private key by decrypting the deposit key by using the symmetric key, and obtains the second partial private key by decrypting the encrypted second partial private key by using the first partial private key and a public key of the user.

23. The system of claim 22, wherein the symmetric key is given in a form of a hash value obtained from the first partial private key by using a one-way random hash function at the user's entity.

24. The system of claim 23, wherein said another entity maintains the second partial private key along with the public key, and delivers the second partial private key and the public key in response to a request from the user's entity; and the private key composition unit decrypts the encrypted second partial private key by using the first partial private key maintained at the user's entity and the public key delivered from said another entity.

25. The system of claim 16, wherein the first partial private key is maintained at the user's entity as a password memorized by the user.

26. The system of claim 25, wherein the partial private key acquisition unit requests a delivery of the second partial private key to said another entity when the password is entered into the user's entity by the user.

27. The system of claim 16, wherein the partial private key acquisition unit requests a delivery of the second partial private key to said another entity when the user carries out the processing according to the RSA cryptosystem at the user's entity.

28. The system of claim 16, wherein the key depositing unit also deposits prime numbers p and q that are used in generating the private key;

said another entity also delivers the prime numbers p and q along with the second partial private key in response to a request from the user's entity; and the private key composition unit also generates a new first partial private key and a new second partial private key which are different from the first partial private key and the second partial private key, without changing a public key of the user, by using the private key obtained from the first partial private key and the second partial private key and the prime numbers p and q delivered from said another entity.

29. A system for depositing a private key used in an RSA cryptosystem, comprising a user's entity and other entities, wherein the user's entity includes:

a private key dividing unit for dividing a private key of a user into a plurality of partial private keys, where one of said plurality of partial private keys is set to be maintained at the user's entity;

a key depositing unit for depositing remaining ones of said plurality of partial private keys to mutually different ones of the other entities respectively;

a partial private key acquisition unit for requesting a delivery of the remaining ones of said plurality of partial private keys to the other entities and receiving the remaining ones of said plurality of partial private keys delivered from the other entities; and a private key composition unit for composing said one of said plurality of partial private keys maintained at the user's entity and the remaining ones of said plurality of partial private keys delivered from the other entities so as to obtain the private key to be used in a processing according to the RSA cryptosystem.

30. The system of claim 29, wherein the key depositing unit also deposits prime numbers p and q that are used in generating the private key to one of the other entities;

said one of the other entities also delivers the prime numbers p and q along with one of the remaining ones of said plurality of partial private keys in response to a request from the user's entity; and the private key composition unit generates a plurality of new partial private keys which are different from said plurality of partial private keys, without changing a public key of the user, by using the private key obtained from said one and the remaining ones of said plurality of partial private keys and the prime numbers p and q delivered from the other entities.

* * * * *